United States Patent Office 3,580,964
Patented May 25, 1971

3,580,964
CURABLE LINEAR POLYESTERS
Gary L. Driscoll, Boothwyn, Pa., assignor to
Sun Oil Company, Philadelphia, Pa.
No Drawing. Continuation-in-part of abandoned application Ser. No. 629,376, Apr. 10, 1967. This application Sept. 6, 1967, Ser. No. 665,711
Int. Cl. C08g 17/10, 17/12; C08f 21/02
U.S. Cl. 260—871
21 Claims

ABSTRACT OF THE DISCLOSURE

Curable polyesters containing an adamantane moiety are prepared in one- or two-stage condensation type reactions. The polyesters are prepared from a hydrocarbon substituted adamantane diol and anhydride of unsaturated diacids such as maleic acid alone or with a second diol such as ethylene glycol. In addition to the anhydrides of unsaturated diacids, the polyester can contain saturated diacid moieties. The polyesters so prepared can be crosslinked with a conventional crosslinking agent and curable polymer can be cast into sheets or films and cured. The curable blend can be used as a coating and cured in place to give chemical-resistant surfaces. The crosslinked polymers exhibit extremely good hydrolytic and solvent stability with good heat and ultraviolet stability.

This application is a continuation-in-part of application Ser. No. 629,376 filed Apr. 10, 1967 now abandoned.

BACKGROUND OF THE INVENTION

Adamantane (tricyclo-[3.3.1.1$^{3,7}$]decane) has a carbon structure containing ten carbon atoms arranged in a completely symmetrical, strainless manner, wherein four of the carbon atoms are in bridgehead positions in the rings. The typographical structure of adamantane is often represented as:

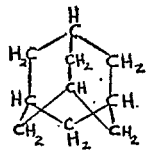

There are four tertiary hydrogen atoms, one at each bridgehead carbon atom. All four bridgehead carbon atoms are equivalent to each other and likewise all rings are equivalent.

The preparation and use of monoesters of 1-adamantane carboxylic acid is taught in the prior art by Spengler et al., Erdol und Kohle-Erdgas-Petrochemic, vol. 15, pages 702–707 (September 1962).

The preparation and use of monoesters of 1-adamantaneol is taught in U.S. Pat. 3,081,337.

The preparation and use of diesters containing adamantane nuclei is shown in the U.S. Pat. 3,398,165 to Irl N. Duling and Abraham Schneider issued Aug. 20, 1968.

A polyester produced from the dimethyl ester of 1,3-adamantane diacid and 1,5-bicyclo (2.2.2) octane dimethanol is shown in French Pat. 1,374,693.

The preparation and use of linear polyesters prepared from alkyladamantane diol and organic diacids is shown in the U.S. Pat. 3,467,627 to Irl N. Duling, Abraham Schneider and Gary L. Driscoll, issued Sept. 16, 1969.

SUMMARY OF THE INVENTION

The present invention relates to novel polyesters. More particularly it relates to curable linear polyesters containing hydrocarbyladamantane moieties, novel intermediate diesters and crosslinked polymers prepared therefrom.

Briefly stated the present invention relates to a linear interpolyester comprising a diol component selected from the group consisting of

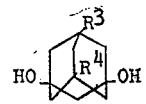

and a mixture of

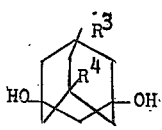

and HO—R$^5$—OH and a dibasic organic acid component anhydride selected from the group consisting of

and mixtures of

and

where R$^1$ is an alkenylene radical having 2 to 20 carbon atoms, R$^2$ is a bivalent organic radical, R$^3$ is a radical having 0 to 20 carbon atoms selected from the group consisting of hydrogen and hydrocarbyl, R$^4$ is a hydrocarbyl radical having 1 to 20 carbon atoms and R$^5$ is a bivalent organic radical other than one containing an adamantane nucleus.

DESCRIPTION OF THE INVENTION

The present invention particularly relates to curable linear polyesters and to the crosslinked polymers produced therefrom. The curable linear polyesters are produced from substituted adamantane diols, wherein the substituent is a hydrocarbon group and an anhydride of an unsaturated organic diacid. In addition a second, different diol can be copolymerized with adamantane diol and the unsaturated diacid. In addition, other organic diacid anhydrides not containing ethylene unsaturation can be employed along with the unsaturated acid anhydride. The linear polyesters containing the unsaturated organic diacid moieties are crosslinked with conventional crosslinking agents to produce rigid thermosetting polymers.

Two methods have been employed to prepare the curable polyesters of the present. In one procedure described as a "one-stage" polymerization, a substituted adamantane diol in admixture with the anhydride of a dibasic organic acid and a second diol is reacted to produce the curable polyester.

Surprisingly the reactions employing only the adamantane diol proceed more readily than those in which a second, different diol is also employed. Thus only a "one-stage" polymerization is employed for this embodiment. A rather novel procedure described as a "two-stage" polymerization has been devised for obtaining the curable linear polyesters having an ordered structure when a second diol is employed. In this procedure the substituted adamantane diol is first reacted with a diacid anhydride which is selected from the group consisting of an unsaturated organic diacid anhydride having the structure

where $R^1$ is an alkenylene radical having 2 to 20 carbon atoms and a mixture of an unsaturated organic diacid anhydride having the structure

and an organic diacid anhydride having the structure

where $R^2$ is a bivalent organic radical with the exclusion of radicals having ethylenic unsaturation. Preferably $R^2$ is a radical having 1 to 20 carbon atoms selected from the group consisting of alkylene, cycloalkylene and arylene.

The product of the reaction is a diester of substituted adamantane diol. Where the diacid anhydride is

the diester is of the structure

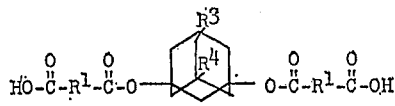

where $R^3$ is a radical having 0 to 20 carbon atoms selected from the group consisting of hydrogen and hydrocarbyl and $R^4$ is a hydrocarbyl radical having 1 to 20 carbon atoms. The term hydrocarbyl is used herein to describe a hydrocarbon radical. Preferably $R^3$ is selected from the group consisting of hydrogen, alkyl, cycloalkyl and aryl and $R^4$ is selected from the group consisting of alkyl, cycloalkyl and aryl. Where the diacid anhydride component is a mixture of anhydrides of the structures

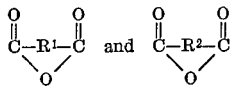 and 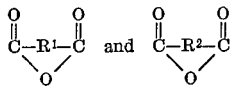

the diester is a mixture of the following structures

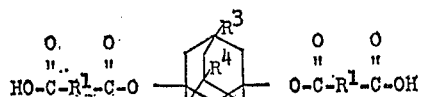

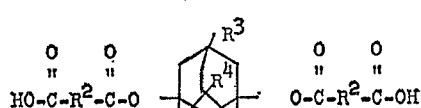

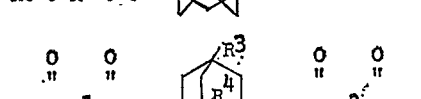

The preparation of diesters using the bridgehead substituted adamantane diols is not as readily accomplished as when aliphatic alcohols or glycols are employed. Attachment of the hydroxyl groups at a bridgehead carbon of the adamantane nucleus makes the group relatively inactive. Many of the known methods of esterification may not be suitable for making the diesters or at least in obtaining them in good yields. Direct esterification of the 1,3-alkyladamantane diol, for example, with the organic diacids by means of an acidic catalyst is not suitable.

However, suitable procedures have been found. These include "one-stage" and "two-stage" melt polymerization using anhydrides of the diacids.

In order to obtain the diester of the substituted adamantane diol, the mole ratio of diol to diacid anhydride is preferably 1:2, although an excess of diacid anhydride beyond the stoichiometric amount can be used. The use of stoichiometric proportions, however, avoids the necessity of removing the unreacted dianhydride prior to the next step in the procedure. When a mixture of diacids is employed as the diacid anhydride component, the unsaturation available for crosslinking sites is reduced by the moles of saturated diacid anhydride employed. For this reason, it is necessary that at least 10 mole percent of the diacid anhydride component be an unsaturated diacid anhydride so that enough crosslinking sites are available in the final linear interpolyester to produce a crosslinking polymer.

The diester or assorted diester mixture as described above is reacted with a diol of the structure HO—$R^5$—OH where $R^5$ is a bivalent organic radical. Preferably $R^5$ is a radical having 2 to 20 carbon atoms selected from the group consisting of alkylene, cycloalkylene, arylene, combination of arylene, alkylene and

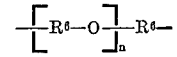

where $R^6$ is an alkylene radical having 2 to 4 carbon atoms and $n$ is an integer of from 1 to 6. A still more preferred $R^5$ is a radical having 2 to 12 carbon atoms selected from the group consisting of alkylene, cycloalkylene, arylene,

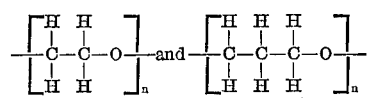

where $n$ is an integer of from 1 to 4.

The reaction of the second diol, HO—R—OH, proceeds rapidly by conventional procedure. The second diol can be employed in a ratio of moles of diol to moles of dibasic material in the range of .90:1.00 to 1.10:1.00, although the usual procedure is to employ a slight excess of the second diol.

The one-stage" process is carried out by mixing the diol to diacid components in the mole ratios in the range of 1.90:2.0 to 2.10:2.0. In the polymerizations where a second diol component is present the reactants are mixed in the mole ratios of substituted adamantane diol component:diacid anhydride component:second diol component being in the range of 1:2:0.90 to 1:2:1.10. Preferably the mole ratios are substantially stoichiometric amounts with only slight excesses of the diacid anhydride component and the second diol component.

The resulting curable linear interpolyester in the "two-stage" process from substituted adamantane diol,

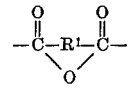

diacid anhydride and HO—R⁵—OH diol components has the structure

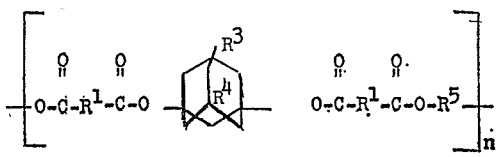

where $R^1$, $R^3$, $R^4$ and $R^5$ have the significance given.

The curable linear interpolyester from the substituted adamantane diol component and mixed diacid anhydride components or from the "one-stage" process cannot be accurately structurally described since it is not possible to predict the sequence of moieties in any particular chain.

The linear interpolyesters will usually have 3 to 10 repeating units comprised of adamantane moiety, diacid moiety and in one embodiment a second diol moiety.

Both types of curable interpolyesters are soluble in conventional solvents such as benzene, chloroform and toluene. Thus, it is possible to measure directly their number average molecular weight ($\overline{M}_N$) using a benzene solution of the interpolyester in a Mechrolab osmometer. The curable interpolyesters of the present invention have number average molecular weights in the range of 500 to 20,000. These interpolyesters can also be characterized by their inherent viscosities. Suitable inherent viscosities for the interpolyesters are in the range of .05 to 1.2.

$$\eta_{inherent} = \ln \frac{\eta_{relative}}{C}$$

where $$\eta_{relative} = \frac{t}{t_0}$$

$t_0$ = flow time through a viscometer of a liquid reference
$t$ = flow time through the same viscometer of a dilute solution of polymer in the reference liquid
$c$ = concentration of polymer in solution expressed in grams/deciliter The solvent employed was 60% phenol, 40% tetrachloroethylene. Concentration was .50±.05 grams per/dl.

The adamantane starting material used to produce the polyester of the present invention is a bridgehead mono- or dialkylated or arylated adamantane having the general formula

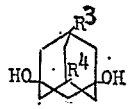

where $R^3$ preferably is a radical having 0 to 20 carbon atoms selected from the group consisting of hydrogen, alkyl, cycloalkyl and aryl. $R^4$ preferably is a radical having 1 to 20 carbon atoms selected from the group consisting of alkyl, cycloalkyl and aryl.

The alkyl- or cycloalkyl adamantane compounds can be produced according to the method disclosed by Schneider et al., Journal of the American Chemical Society, vol. 86, pages 5365–5367. The arylated adamantane compounds can be produced be reacting the bromoadamantane with an excess of aromatic compounds in a procedure such as that employed by Stetter et al., Ber., 97 (12) 3488–92 (1964).

The substituted adamantanes for the present invention can have either non-branched or branched alkyl groups and can have one or more cycloalkyl or aryl radicals in the substituted adamantane moiety with a total number of carbon atoms in each R group ranging up to 20. The diols of the alkylated adamantanes can be produced by reacting the parent hydrocarbon with chromic acid according to the procedure disclosed in the copending application of Robert E. Moore, Ser. No. 421,614, filed Dec. 28, 1964 now abandoned. This procedure will also produce the diols of the arylated adamantane.

Examples of such reactants are the 5,7-dihydroxy derivatives of the following hydrocarbons:

1-methyladamantane;
1-ethyladamantane;
1,3-dimethyladamantane;
1-methyl-3-ethyladamantane;
1,3-diethyladamantane;
1-n-propyladamantane;
1-isopropyladamantane;
1-n-butyladamantane;
1,3-di-n-pentyl-adamantane;
1-methyl-3-heptyladamantane;
1-n-decyladamantane;
1-n-decyl-3-ethyladamantane;
1-methyl-3-propyladamantane;
1-isohexyladamantane;
1-methyl-3-cyclohexyladamantane;
1-phenyladamantane;
1-methyl-3-phenyladamantane;
1,3-phenyladamantane and the like.

In regard to the structures given above, it should be noted that of the substituents specified at the bridgehead positions of the adamantane moiety only $R^3$ may be a hydrogen atom. Thus, in any composition according to the invention, there will at most be only one tertiary hydrogen atom in each adamantane moiety. More preferred compositions have no tertiary hydrogen atom in the adamantane moiety thus in these more preferred compositions R will be either an alkyl, cycloalkyl or aryl group. Most preferably because of the ease with which they may be obtained, the bridgehead substituents will be methyl or ethyl groups or both.

The unsaturated dibasic organic anhydride

is derived from a dibasic organic acid having 2 to 20 carbon atoms and includes for example the anhydrides of maleic fumaric, methyl fumaric, itaconic, muconic, α,α'-dimethylmuconic acids and the like.

One organic diacid anhydride is characterized by the formula

wherein $R^2$, the bivalent radical, can be selected from the following groups: aromatic, aliphatic, cycloaliphatic, combination of aromatic and aliphatic, heterocyclic, bridged organic radicals wherein the bridge is oxygen, nitrogen or sulfur and substituted groups thereof. Such substituents include halogen, amino, methoxy, sulfide and the like provided that such substituents do not interfere with the polyesterification. The preferred $R^2$ group is a radical having 1 to 20 carbon atoms selected from the group consisting of alkylene, cycloalkylene and arylene. Preferably there is no ethylenic unsaturation in the $R^2$ radical.

In carrying out the esterifications, the diacid anhydrides

are usually employed because of their greater activity; however, less effective procedures employing the diacids and acyl chlorides thereof can be carried out to give substantially the same polymers. The dibasic component is for example anhydrides of the following acids: adipic; pimelic; suberic; azelaic; sebacic; undecanedioic; orthophthalic; isophthalic; terephthalic; 1,2,2-trimethyl-1,3-cyclopentane dicarboxylic; bromopropanedioic; 3-methyl-1; 1-butanedicarboxylic; mesoxalic; 4,6-dimethylisophthalic; 1-glutamic; 2,6-naphthalene dicarboxylic; o,o'-azobenzenedicarboxylic; p,p'-azobenzenedicarboxylic; o,o'-azoxydibenzoic; p,p'-benzophenone dicarboxylic; 2,3-dihydroterephthalic; 1-3, 3'-dithiobis (2-amino propanoic); 2,5-furandicarboxylic; oxydiethanoic; 3,5-pyridinedicarboxylic; α-2-toluenedicarboxylic; tetrachloro phthalic; quinolinic; α-amino-succinic; tartronic; benzyltartonic; 2,3-thiophenedicarboxylic; isohemipinic and the like.

The non-adamantane diol is characterized by the formula HO-R⁵-OH where R⁵, the bivalent radical can be selected from the following groups: aromatic, aliphatic, cycloaliphatic, combinations of aromatic and aliphatic, heterocyclic, bridged organic radicals wherein the bridge is oxygen, nitrogen or sulfur and substituted groups thereof. Such substituents include amino, ketone, methoxy, halogen and the like provided that the substituents do not interfere in the polyesterifications.

Suitable diols for producing the present polyesters include ethylene glycol;
trimethyl glycol;
1,4-butanediol;
1,4-pentanediol;
1,6-hexanediol;
1,7-heptanediol;
1,8-octanediol;
2,2-diethyl-1,3-propanediol;
1,2-propanediol;
2-ethyl-2-n-butyl-1,3-propanediol;
diethylene glycol;
triethylene glycol;
tetraethylene glycol;
dipropylene glycol;
cyclohexanediol;
hydroquinone;
isopropylidene-bis-phenol;
α,3-toluenediol;
2,4-dihydroxy toluene;
1,3-dihydroxy-4-ethylbenzene;
2,5-p-cymenediol;
α,α'-p-xylenediol;
α,5-m-xylenediol;
2,6-naphthalenediol;
1,2-anthracenediol;
3,4-phenanthrenediol;
1,1-bi-2-naphthol;
1,1,2,2-tetraphenyl-1,2-ethanediol;
3,3'-dihydroxybiphenyl;
2,3-diphenyl-1,2-butanediol;
4-methylpyrocatechol;
2,2,2-tribromo-1,1-ethanediol;
2,2,3-trichloro-1,1-butanediol;
2,2,2-trichloro-1,1-ethanediol;
2-bromo-1,4-benzenediol;
α-nitroalizarin;
6-amino-5-triazon-2,4-diol;
2,2'-dihydroxyazobenzene;
diethanolamine;
dipropanolamine;
2,2'-ethyliminodiethanol;
2-amino-2-ethyl-1,3-propanediol;
2,6-pyridinediol;
i-1-p-menthene-6,8-diol;
isonaphthazarin;
1,2-dihydroxyanthraquinone;
2,7-dihydroxyanthraquinone;
2,4-dihydroxybenzophenone;
3-(4-hydroxy-3-methoxyphenyl)-2-propen-1-ol;

4,4'-dihydroxy-3,3'-5,5'-tetramethyoxybiphenyl;
1,3-dihydroxy-2-propanone;
2,2'-thiodiethanol and the like.

Preferred diols are ethylene glycol; 1,4-butanediol; and trimethylene glycol.

A well-known decomposition route for conventional types of esters depends upon their ability, under appropriate conditions, to transfer a hydrogen atom from the beta position of the alcohol derived moiety in the following manner:

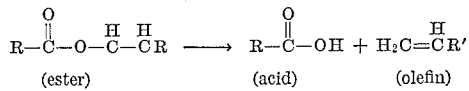

This decomposition results, as shown, in the conversion of the ester into an acid and an olefin. While most prior art polyesters can undergo this decomposition at high temperatures, the present esters cannot as this would require the formation of a double bond in the adamantane nucleus which will not occur. The decomposition cannot occur because the carbon atoms in the adamantane nucleus through which the ester bond is made is a quaternary carbon atom. This unique stability of the polyesters contributes to the stability of the crosslinked polymers described below.

The interpolyester of the invention can be crosslinked with a suitable crosslinking agent. The crosslinking agent is an unsaturated, polymerizable hydrocarbon containing a $CH_2=C<$ linkage, which can serve as a solvent for the polyester and, upon polymerization forms a co-polymer with the polyester. Suitable crosslinking agents include styrene, butadiene, methyl methacrylate, vinyl-acetate, acrylonitrile, methyl acrylate divinyl benzene and cyclopentadiene and the like. A preferred crosslinking agent is selected from the group consisting of styrene and methyl methacrylate. Either conventional hot or cold curing procedures can be employed at atmospheric, superatmospheric or subatmospheric pressures. The crosslinking agent is blended with the interpolyesters at a temperature in the range of −5 to 100° C. usually about 50° C. until a homogenous mixture is obtained. The blending can take place in the presence of a small amount of a polymerization inhibitor such as hydroquinone or 2,6-di-t-butyl-phenol to prevent premature crosslinking.

The amount of crosslinking agent employed is in the range of .5:1 to 7:1 moles of crosslinking agent to moles of unsaturation.

After blending, the mixture is cured at a temperature in the range of 50 to 150° C. for .5 to 10 hours in the hot cure and 20 to 50° C. for .5 to 10 hours in the cold cure. The small amounts of inhibitor added during the blending does not interfere with curing. Generally a free radical catalyst such as benzoyl peroxide, axo-bis-isobutyronitrile or tert-butyl hydroperoxide for hot cures and methyl ethyl ketone peroxide in dimethyl phthalate for cold cures is employed. In addition to the catalyst, promoters or accelerators such as N,N'-dimethylaniline or 1% cobalt naphthenate, in styrene can be employed during the curing.

Prior to curing, fillers such as glass wool, asbestos, color pigments and the like can be added to blend. Glass wool, i.e., glass fiber is a preferred filler and can be employed in amounts up to 70% by weight to produce useful structural laminates.

The crosslinked polymers are thermosetting, have good light stability, moderate mold shrinkage, high heat distortion temperatures and high hydrolytic and solvent stability. The uncrosslinked curable linear interpolyester have good shelf life because of the highly hindered substituted adamantane structure.

The crosslinked polymers are suitable for making molded articles, such as embedding an object in the polymer for preservative or decoraative purposes. The crosslinked polymers can be molded in thin film of 5 to 20 mils thickness and used in blister packaging.

Because of the crosslinked polymers' very good light and hydrolytic stabilities, they can be molded into objects for outdoor use or into structural shapes such as sheets of .1 to .5 centimeter thickness for use in construction.

The curable mixture of polyester and crosslinking agent can be applied to a surface and cured in place. Because of their excellent hydrolytic and solvent stability, the crosslinked polymers can be used to cover the surfaces of chemical and industrial equipment subject to corrosive attack. Certain ratios of reactants have been specified in the examples. It is to be understood that those of skill in the art will be able to select the respective proportion from each range so as to produce compositions within the spirit and scope of the invention as disclosed. The examples provice guidelines to indicate to those of skill in the art the means and manner of reactant selection, procedures for utilizing the reactants, and the general nature of the polymers to be obtained.

EXAMPLE 1

1,3-dihydroxy-5,7-dimethyladamantane (DMA diol) (50 g.=0.254 mole), maleic anhydride (50 g.=0.51 mole), and 10 drops tetraisopropyltitanate catalyst were placed in a large (1¾ inch diameter) polymerization tube. A slow stream of nitrogen was passed through a capillary reaching to the bottom of the tube while the mixture was heated at 205° C. for one hour. To the resulting clear, light yellow, liquid which was determined to be essentially 1,3-dimaleate-5,7-dimethyladamantane was added diethylene glycol (27 ml.=slight excess). Heating under nitrogen at 205° C. was continued for a further ninety minutes while 9 ml. of water were distilled from the melt. A vacuum (.07 mm. Hg) was then maintained on the system for forty-five minutes at 205° C. When cooled, the resulting light yellow interpolyester was a very viscous sticky liquid. ($\overline{M}_N$=2350; Mechrolab osmometer in benzene solution). Inherent viscosity $\eta_{inh}$=.15.

EXAMPLE 2

A blend of the interpolyester of Example 1 (50 g.) and styrene (50 g.) was prepared by stirring for two minutes at about 50° C. in the presence of a trace of hydroquinone, a phenolic inhibitor. To this mixture was added 0.6 g. of benzoyl peroxide.

EXAMPLE 3

One portion of the catalyzed mixture of Example 2 was placed in a mold and heated to 80° C. for 16 hours. A second portion was mixed with ordinary untreated glass fibers to produce a filled sheet between glass plates. This was cured for 16 hours at 100° C. To a third portion was added one drop of N,N-dimethylaniline as an accelerator. This mixture gelled in about four minutes at room temperature and was pressed between glass plates and postcured at 80° C. for 16 hours.

All pieces were yellow, hard and tough. Most were somewhat brittle, but the glass filled piece was very strong. Where smooth casting surfaces were used, the polymer had a high gloss. Molded pieces showed some evidence of shrinkage.

EXAMPLE 4

A mixture of DMA diol (10.01 g.), maleic anhydride (10.03 g.), 1,2-propylene glycol (4.16 g.=7% excess) and hydroquinone (0.0135 g.) were heated at 190–200° C. with stirring in a stream of nitrogen for 18 hours. The acid value of the reaction mixture was then 18. Volatiles were removed by pumping for a few minutes at 190–200° C. The product (15.38 g.) was treated with additional hydroquinone (0.0135 g.) and blended with styrene (7.69 g.).

EXAMPLE 5

1,3-dihydroxy-5,7-dimethyl adamantane (10.00 g.) and maleic anhydride (10.00 g.) were heated together, while a stream of dry, oxygen-free nitrogen was passed through the molten mixture. After 1 hour at 120–140° C. the acid value was found to be 289 (theory, 286; this is the number of mg. of potassium hydroxide required to neutralize 1 g. of sample). 1,2-propylene glycol (4.04 g., ca. 5% excess) was then added and the mixture was heated at 180–190° C. for 33 hours, until the acid value had reached 37 (a further small amount of glycol was added to replace losses by distillation). The product was stabilized by the addition of hydroquinone (0.05%), heated at 180° C. under vacuum to remove volatiles, and then blended with styrene (50 parts by weight per 100 parts by weight of polyester).

EXAMPLE 6

A portion of the mixture of Example 5 was heated 7 to 10 minutes at 100° C. with 0.2 wt. percent benzoyl peroxide until a gel was formed. The temperature was then raised to 120° C. over a five-minute period and maintained at 120° C. for a further five minutes. The casting was hard, clear and uncolored.

EXAMPLE 7

A portion of the mixture of Example 5 was treated with a mixture of 5 wt. percent of 50% methyl ethyl ketone peroxide in dimethyl phthalate (a hardener) and 5 weight percent of 1% cobalt naphthenate in styrene (an accelerator) and kept at room temperature. The mixture gelled in five minutes to give a hard casting after two hours. When 1 wt. percent of each additive was empoyed, the casting was soft and rubbery after two days. The castings were darker in color and more opaque than those produced by hot curing.

EXAMPLE 8

The cold curing procedure of Example 7 was repeated and modified by using two parts by weight of the hardener and three parts by weight of the accelerator to 100 parts of resin. The mixture was allowed to gel overnight, then post-cured for one hour at 40° C., one hour at 50° C., one hour at 70° C. and finally four hours at 110° C. The castings were lightly colored and hard.

EXAMPLE 9

A portion of the mixture of Example 4 was cured according to the procedure of Example 8. The castings were light yellow and hard.

EXAMPLE 10

A mixture of 1,3 - dihydroxy - 5,7-dimethyladamantane (10.00 g.), maleic anhydride (5.00 g.), and phthalic anhydride (7.55 g.) was heated for one hour at 160–170° C. under nitrogen as in Example 4; the acid value was then 252 (theory 254). Propylene glycol (5.85 g.) was added and the mixture was heated at 180–190° C. until the acid value had fallen to 34 (16 hours). After removal of the volatiles by pumping at 180° C., the resin was stabilized with hydroquinone (0.04%) and blended with styrene (50 parts by weight per 100 parts by weight of polyester).

EXAMPLE 11

A portion of the mixture of Example 10 was heated 7 to 10 minutes at 100° C. with 0.2 weight percent benzoyl peroxide until a gel formed. The temperature was then raised to 120° C. over a five minute period, and maintained at 120° C. for a further five minutes. The casting was rather soft, so it was post-cured for one hour at 110° C. The casting produced was clear and hard.

EXAMPLE 12

A portion of the mixture of Example 10 was treated with a mixture of 3 weight percent of 50% methyl ethyl ketone peroxide in dimethyl phthalate (a hardener) and 3 weight percent of 1% cobalt naphthenate in styrene (an accelerator) and kept at room temperature. The mixture gelled in 20 minutes to give a hard casting at 18 hours. The casting was darker and more opaque than that of Examples 11 and 13.

EXAMPLE 13

A portion of the mixture of Example 10 was treated according to the procedure of Example 8. The castings were hard and somewhat opaque.

EXAMPLE 14

The procedure of Example 5 was repeated, but the polyester was blended with styrene to give 1.75 moles of styrene per double bond and a portion of the mixture cured according to Example 8. The castings were hard and opaque.

A comparison of some of the crosslinked polymers of the examples is presented in tables below.

TABLE I

| Example | Hardness[1] | Specific gravity | Mean load at break (g.) | Mean deflection[2] (in. ×10⁻³/g.) | $f$ Mean flexural strength (p.s.i.)[2] | Moles styrene per mole "unsaturation" i.e., per mole of maleic acid units | Thermal stability,[3] percent wt. loss at ° C. | | | |
|---|---|---|---|---|---|---|---|---|---|---|
| | | | | | | | 5% | 10% | 25% | 50% |
| 8 | 90 | 1.16 | 5,510 | 0.0036 | 4,740 | 1.04 | | | | |
| 9 | 85 | | 3,860 | 0.0043 | 3,270 | 1.04 | | | | |
| 13 | 82 | 1.17 | | | 9,840 | 2.3 | | | | |
| 14 | | | 4,370 | 0.004 | 3,500 | 1.75 | 305 | 334 | 363 | 385 |
| 15 | 82 | | 11,750 | 0.0043 | 11,890 | 1.7 | | | | |

[1] Measured with a Barcol Impressor GYZJ-935.
[2] The castings were machined into bars (1.50 x 0.25 x 0.125 in.) which were clamped 0.25 inch from both ends and loaded in the middle. The mean deflection (in.×10⁻³ per gm.) at the breaking point is calculated from the load at break and deflection at break (deflection being measured in the middle of the sample). The mean flexural strength is calculated according to the equation $f = \frac{1.5\,WL}{BD^2}$ where W=load at break; L=distance between supports; B=width of sample; D=thickness of sample. Total load in grams for samples V, VIII and X was 2070, 2957 and 5373 respectively.
[3] Conducted in a DuPont 950 Thermogravimetric Analyzer in air, at a heating rate of 15° C. per minute.

HYDROLYTIC STABILITY

For each polyester, the flexural strength as determined above of one set of untreated bars (1.50" x 0.25" x 0.125") was measured as a control, and the other sets were treated as follows.

(i) After immersion in boiling water for 24 hours, the samples were blotted dry, and their appearance was noted (for cracks, distortion, coloration, etc.). The changes in weight were recorded, and the flexural strengths and deflections at break were measured.

(ii) As in (i), after immersion in boiling 6 N-sulphuric acid for 24 hours.

(iii) As in (i), after immersion in boiling 6 N-sodium hydroxide for 24 hours.

Results (mean of three measurements in each case) are given in Table II.

TABLE II

| Test group | Example | Weight change (percent) | Flexural strength (p.s.i.) | Flexural strength change (percent) | Deflection at break (in. × 10⁻³) | Deflection change (percent) |
|---|---|---|---|---|---|---|
| Control | 13 | | 9,840 | | 23.7 | |
| | 14 | | 3,500 | | 13.7 | |
| | 15 | | 11,890 | | 36.0 | |
| | 16 | | 5,620 | | 22.3 | |
| | 17 | | 18,690 | | 88.7 | |
| Boiling water | 13 | +4.1 | 5,550 | −43.5 | 20.8 | −12.2 |
| | 14 | +0.9 | 3,250 | −7.1 | 12.5 | −8.8 |
| | 15 | +2.0 | 5,620 | −52.8 | 22.6 | −37.2 |
| | 16 | +1.4 | 3,735 | −33.5 | 15.8 | −29.2 |
| | 17 | +0.8 | 11,910 | −36.3 | 40.1 | −54.8 |
| Boiling 6N-H₂SO₄ | 13 | +1.8 | 8,130 | −17.4 | 29.3 | +23.6 |
| | 14 | +0.4 | 3,280 | −6.3 | 11.5 | −16.1 |
| | 15 | +1.2 | 8,990 | −24.4 | 33.4 | −7.2 |
| | 16 | +0.7 | 4,000 | −28.8 | 17.8 | −20.2 |
| | 17 | +0.5 | 17,640 | −5.6 | 76.3 | −14.0 |
| Boiling 6N-NaOH | 13 | +4.2 | 5,060 | −48.6 | 33.5 | +41.3 |
| | 14 | +1.6 | 4,700 | +34.3 | 17.3 | +20.8 |
| | 15 | Failed Samples were soft, white and distorted. Could not be tested. | | | | |
| | 16 | +6.1 | 2,990 | −46.8 | 18.6 | −16.6 |
| | 17 | −0.3 | 6,490 | −65.4 | 26.7 | −69.8 |

EXAMPLE 15

For comparison, a conventional curable interpolyester was prepared from maleic anhydride, phthalic anhydride and propylene glycol (molar proportions 1:1:2) and blended with 50 parts by weight of styrene per 100 parts by weight of interpolyester (44 wt. percent styrene). This was cured according to the procedure of Example 8.

EXAMPLE 16

A commercial resin based on bisphenol with styrene and stated to have exceptional resistance to chemical attack was cured according to Example 8 for comparison.

EXAMPLE 17

A commercial resin based on neopentyl glycol and isophthalic acid with styrene was cured as in Example 8 for comparison.

RESISTANCE TO COMMON SOLVENTS

These tests involved in use of small machined bars, as for hydrolytic stability. The polyester bars were immersed, in sets of three, in each of the solvents benzene, acetone, chloroform and m-cresol. After immersion for 300 hours at room temperature, the samples were removed and blotted dry; their appearance was noted, and weight changes, flexural strengths and deflections as determined above at break were measured. Table III shows the results, which include the percentage increase or decrease in flexural strength and deflection at break (based on results from the untreated samples of Table II).

TABLE III

| Test group | Example | Weight change (percent) | Flexural strength (p.s.i.) | Flexural strength change (percent) | Deflection at break (in. × 10⁻³) | Deflection change (percent) |
|---|---|---|---|---|---|---|
| Benzene, 300 hours | 13 | +0.1 | 11,670 | +18.6 | 31.1 | +31.3 |
|  | 14 | +0.8 | 8,680 | +148 | 27.3 | +99.3 |
|  | 15 | +0.3 | 15,020 | +26.3 | 51.1 | +41.9 |
|  | 16 | +0.3 | 5,540 | −1.4 | 24.5 | +9.9 |
|  | 17 | +2.6 | 9,890 | −47.1 | 46.2 | −47.9 |
| Acetone, 300 hours | 13 | Gradually disintegrated after 50 hours. | | | | |
|  | 14 | +8.2 | 4,210 | +20.3 | 24.1 | +76.0 |
|  | 15 | Completely disintegrated after 100 hours. | | | | |
|  | 16 | Cracking began after 150 hrs. Too badly cracked to test. | | | | |
|  | 17 | Badly cracked after 70 hours. Disintegrated after 120 hours. | | | | |
| Chloroform, 300 hours | 13 | Completely disintegrated after 50 hours. | | | | |
|  | 14 | +17.8 | 5,610 | +60.3 | 31.5 | +129.9 |
|  | 15 | Completely disintegrated after 100 hours. | | | | |
|  | 16 | Completely disintegrated after 100 hours. | | | | |
|  | 17 | Completely disintegrated after 70 hours. | | | | |
| m-Cresol, 300 hours | 13 | −0.2 | 12,930 | +31.4 | 36.3 | +53.2 |
|  | 14 | −0.2 | 4,350 | +24.3 | 13.8 | +0.7 |
|  | 15 | +0.5 | 13,760 | +15.7 | 44.7 | +24.1 |
|  | 16 | −0.6 | 6,280 | +11.7 | 26.6 | +19.3 |
|  | 17 | +2.1 | 18,460 | −1.2 | 97.0 | +9.4 |
| Jet fuel, 22 hrs. 100° | 13 | −0.4 | 8,810 | −10.5 | 24.9 | +5.1 |
|  | 14 | −0.2 | 4,480 | +28.0 | 15.2 | +10.9 |

U. V. STABILITY

Small machined bars were used as above and tested in groups of three. The bars were aged in ultraviolet light from an enclosed carbon arc source until Standard 6 of B.S. 1006 had faded. The samples were then examined for gross color changes, crazing, etc. Color changes were assessed more quantitatively by means of a Lovibond tintometer, Type D, and finally the flexural strength and deflection were measured. These results are given in Table IV again using the results for the control sets (Table II) as a reference.

TABLE IV

| Test | Ex. 13 | Ex. 14 | Ex. 15 | Ex. 16 | Ex. 17 |
|---|---|---|---|---|---|
| Flexural strength (p.s.i.) | 7,760 | 3,250 | 8,070 | 4,310 | 20,340 |
| Flexural strength change (percent) | −21.2 | −7.1 | −32.1 | −23.3 | +8.1 |
| Deflection at break (in. × 10⁻³) | 20.4 | 12.4 | 22.4 | 21.8 | 71.6 |
| Deflection change (percent) | −13.9 | −9.5 | −37.8 | −2.2 | −19.3 |

| | Before | | | After | | |
|---|---|---|---|---|---|---|
| Tintometer readings [1] | R | Y | B | R | Y | B |
| Example: | | | | | | |
| 13 | 3.6 | 13 | 0.9 | 3.8 | 13 | 0.9 |
| 14 | 2.5 | 4.1 | 0 9 | 2.5 | 4.1 | 0.9 |
| 15 | 1.5 | 3.6 | 0 9 | 1.7 | 3.7 | 0.9 |
| 16 | 1.7 | 3.4 | 0 9 | 1.8 | 3.3 | 0.9 |
| 17 | 0 9 | 1.2 | 0.9 | 1.2 | 1.5 | 0.9 |

[1] Samples attached to light box outlet; R=red, Y=yellow, B=blue. Qualitatively, all samples appeared slightly darker after exposure to U.V., and the Example 17 samples were slightly yellow, but in no case was there visible evidence of crazing or other surface effects. Weight changes were negligible.

EXAMPLE 18

1,3 - dihydroxy - 5,7 - dimethyladamantane (9.81 g.— .050 mole) and maleic anhydride (4.90 g.—.050 moles) were heated seven hours at 170° C. in the presence of p-toluene sulfonic acid (.05 g.).[1] Approximately the theorectical amount of water (1 ml.) was distilled from the mixture during this time. The reaction mixture changed gradually in appearance from a soft solid, through a solid-liquid mixture, to a slightly viscous, clear yellow liquid. The liquid set to a glass near room temperature. The molecular weight of the polymer was 1150 (Mecrolab osmometer in benzene solution). The infrared spectrum of the polymer showed the presence of ester linkages (5.81, 7.8, 8.55), unsaturation (6.08, 6.75), probable adamantane rings (7.2 multiplet), and free carboxylic acid (2.9, 3.8).

The ester was blended with styrene (30% by weight) and cured with methylethylketone peroxide and cobalt naphthenate accelerator. The cure cycle was one hour at room temperature, two hours at 60° C., two hours at 100° C., and eight hours at 140° C. Thin pieces of cured polymer were not affected by chloroform after two months contact therewith.

The invention claimed is:
1. A linear crosslinkable interpolyester consisting essentially of the reaction product of a diol selected from the group consisting of

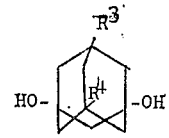

and a mixture of

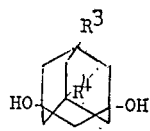

and HO—$R_5$—OH and a dibasic organic acid anhydride selected from the group consisting of

and mixtures of

and

where $R^1$ is an alkenylene radical having 2 to 20 carbon atoms, $R^2$ is a bivalent organic radical selected from the group consisting of aromatic, aliphatic, cycloaliphatic, combination of aromatic and aliphatic, heterocyclic, bridged organic radicals wherein the bridge is oxygen, nitrogen or sulfur substituted groups thereof, $R_3$ is a radical having 0–20 carbon atoms selected from the group consisting of hydrogen and hydrocarbyl, $R^4$ is a hydrocarbyl radical having 1 to 20 carbon atoms and $R^5$ is a bivalent organic radical other than one containing an adamantane nucleus

---

[1] The reaction has been run under the same conditions without the p-toluene sulfonic acid. The p-toluene sulfonic acid appears to have a catalytic effect.

selected from the group consisting of alkylene, cycloalkylene, arylene, combinations of arylene, alkylene and

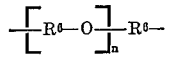

where $R^6$ is an alkylene radical having 2 to 4 carbon atoms and $n$ is an integer of from 1 to 6.

2. A linear interpolyester according to claim 1 wherein the diol component is a mixture of

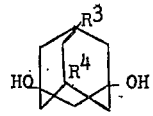

and HO—$R^5$—OH.

3. A linear interpolyester according to claim 1 wherein $R^3$ is selected from the group consisting of hydrogen, alkyl, cycloalkyl and aryl, $R^4$ is selected from the group consisting of alkyl, cycloalkyl and aryl.

4. A linear interpolyester according to claim 3 wherein $R^2$ is a radical having 1 to 20 carbon atoms selected from the group consisting of alkylene, cycloalkylene and arylene.

5. A linear interpolyester according to claim 2 wherein $R^2$ is a radical having 1 to 20 carbon atoms selected from the group consisting of alkylene, cycloalkylene and arylene and $R^5$ is a radical having 2 to 20 carbon atoms selected from the group consisting of alkylene, cycloalkylene, arylene, combinations of arylene and alkylene and

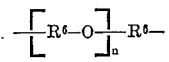

where $R^6$ is an alkylene radical having 2 to 4 carbon atoms and $n$ is an integer of from 1 to 6.

6. A crosslinked polymer comprising the reaction product of a linear interpolyester according to claim 1 and an unsaturated polymerizable crosslinking agent.

7. A crosslinked polymer according to claim 6 wherein the crosslinking agent is selected from the group consisting of styrene and methyl methacrylate.

8. A crosslinked polymer according to claim 6 wherein the adamantane diol is 1,3-dihydroxy - 5,7 - dimethyladamantane, the dibasic organic acid anhydride is selected from the group consisting of maleic anhydride, itaconic anhydride and mixtures thereof with orthophthalic anhydride, the diol, HO—$R^5$—OH, is selected from the group consisting of ethylene glycol and propylene glycol and the crosslinking agent is selected from the group of styrene and methyl methacrylate.

9. A linear interpolyester according to claim 1 wherein the adamantane diol and the dibasic organic acid anhydride component are preformed to a dibasic material selected from the group consisting of a diester of the structure

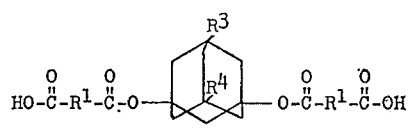

and a mixture of diesters of the structures

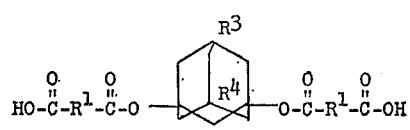

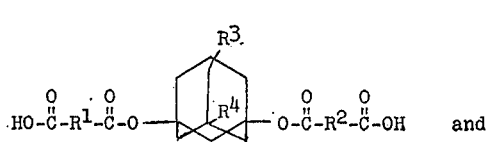

and

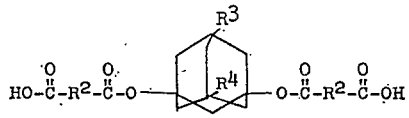

10. A linear interpolyester according to claim 9 wherein the dibasic material has the structure

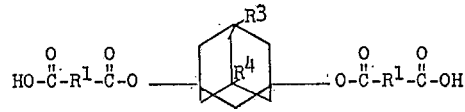

wherein $R^1$ is

11. A linear interpolyester according to claim 9 wherein the dibasic component has the structure

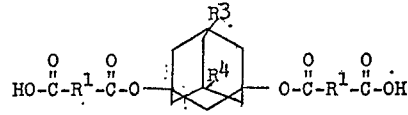

where $R^3$ and $R^4$ are methyl, $R^1$ is —C=C— and $R^5$ is selected from the group consisting of

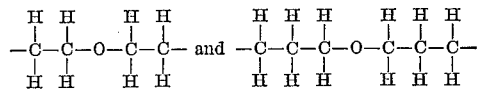

12. A crosslinked polymer comprising the reaction product of the linear polyester of claim 9 wherein the dibasic component has the structure

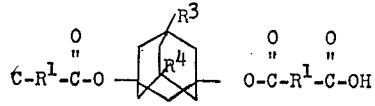

where $R^3$ and $R^4$ are methyl and $R^1$ is

and $R^5$ is selected from the group consisting of

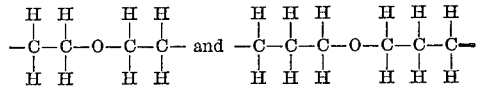

and styrene.

13. A linear interpolyester according to claim 1 wherein the diol component is

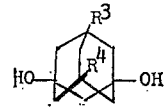

14. A linear interpolyester according to claim 13 wherein the dibasic acid anhydride is maleic anhydride.

15. A crosslinked polymer comprising the reaction product of a linear interpolyester according to claim 14 and styrene.

16. A linear interpolyester according to claim 13 wherein the organic acid anhydride is itaconic anhydride.

17. A crosslinked polymer comprising the reaction product of a linear polyester according to claim 16 and styrene.

18. A linear interpolyester according to claim 13 wherein the organic acid anhydride is maleic anhydride mixed with orthophthalic anhydride.

19. A crosslinked polymer comprising the reaction product of a linear polyester according to claim 18 and styrene.

20. A linear interpolyester according to claim 13 wherein the organic acid anhydride is itaconic anhydride mixed with orthophthalic anhydride.

21. A crosslinked polymer comprising the reaction product of a linear polyester according to claim 20 and styrene.

References Cited

UNITED STATES PATENTS

| | | | |
|---|---|---|---|
| 2,415,366 | 2/1947 | Muskat | 260—485 |
| 3,221,043 | 10/1965 | Fekete et al. | 260—485 |
| 3,342,880 | 9/1967 | Reinhardt | 260—75 |
| 3,467,627 | 9/1969 | Duling et al. | 260—75 |

FOREIGN PATENTS

| | | | |
|---|---|---|---|
| 766,666 | 1/1957 | Great Britain | 260—871 |

OTHER REFERENCES

Boenig, Unsaturated Polyesters, Elseier, New York 1964, pp. 2, 112–13, 120–22, 139 and 160–61.

WILLIAM H. SHORT, Primary Examiner

M. GOLDSTEIN, Assistant Examiner

U.S. Cl. X.R.

260—40, 75, 475, 869